(12) United States Patent
Li et al.

(10) Patent No.: US 11,656,493 B1
(45) Date of Patent: May 23, 2023

(54) DISPLAY APPARATUS

(71) Applicant: Au Optronics Corporation, Hsinchu (TW)

(72) Inventors: Chao-Wei Li, Hsinchu (TW); Wei-Ming Cheng, Hsinchu (TW); Yi-Ling Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/844,074

(22) Filed: Jun. 20, 2022

(30) Foreign Application Priority Data

Dec. 23, 2021 (TW) .................................. 110148375

(51) Int. Cl.
*G02F 1/1335* (2006.01)
*G02F 1/1347* (2006.01)

(52) U.S. Cl.
CPC ...... *G02F 1/133512* (2013.01); *G02F 1/1347* (2013.01); *G02F 1/13473* (2013.01); *G02F 1/13478* (2021.01); *G02F 2201/343* (2013.01); *G02F 2203/02* (2013.01)

(58) Field of Classification Search
CPC ............. G02F 1/133512; G02F 1/1347; G02F 1/13478; G02F 2201/343
See application file for complete search history.

(56) References Cited

U.S. PATENT DOCUMENTS

2008/0291368 A1    11/2008  Park et al.

FOREIGN PATENT DOCUMENTS

| CN | 102162952 | | 8/2011 | |
|---|---|---|---|---|
| CN | 102162952 A | * | 8/2011 | ........... G02F 1/1335 |
| CN | 112612160 | | 4/2021 | |
| TW | 201349053 | | 12/2013 | |
| TW | M592536 | | 3/2020 | |
| TW | M594163 | | 4/2020 | |

* cited by examiner

*Primary Examiner* — Jessica M Merlin
(74) *Attorney, Agent, or Firm* — JCIPRNET (57) ABSTRACT

Provided is a display apparatus including a first cholesteric liquid crystal panel, a second cholesteric liquid crystal panel, and a third cholesteric liquid crystal panel. The first cholesteric liquid crystal panel has a light receiving surface. The second cholesteric liquid crystal panel overlaps the first cholesteric liquid crystal panel and is disposed on a side of the first cholesteric liquid crystal panel away from the light receiving surface. The third cholesteric liquid crystal panel overlaps the second cholesteric liquid crystal panel and is disposed on a side of the second cholesteric liquid crystal panel away from the first cholesteric liquid crystal panel. One of the first cholesteric liquid crystal panel, the second cholesteric liquid crystal panel, and the third cholesteric liquid crystal panel is provided with multiple first light shielding patterns separated from each other.

11 Claims, 9 Drawing Sheets

DISPLAY APPARATUS

CROSS-REFERENCE TO RELATED APPLICATION

This application claims the priority benefit of Taiwan application serial no. 110148375, filed on Dec. 23, 2021. The entirety of the above-mentioned patent application is hereby incorporated by reference herein and made a part of this specification.

BACKGROUND

Technical Field

The disclosure relates to a display technology, and more particularly to a display apparatus.

Description of Related Art

In recent years, considerable advances in flexible displays, electronic papers, and electronic books have been taking place through display technologies such as cholesteric liquid crystal display technology, electrophoretic display technology, and electrochromic display technology. Compared with other display technologies, cholesteric liquid crystal display technology has passive driving characteristics, better brightness and contrast performance, and other advantages, thus becoming one of the mainstream technologies for electronic paper applications.

For a full-color cholesteric liquid crystal display, a stacked structure using three layers of cholesteric liquid crystal panels is proposed. The structure changes the color of the reflected light by stacking three layers of cholesteric liquid crystals that can reflect different colors and combining various driving methods. Most liquid crystal panels are equipped with spacers for controlling the thickness of liquid crystal layers, and the spacers affect the arrangement of liquid crystal molecules around, which makes light leakage tends to occur around the spacers when the display is dark. Therefore, light shielding pattern layers are required to shield the light leakage caused by the spacers to improve display contrast. However, the light shielding pattern layers might cause multiple cholesteric liquid crystal panels to easily form moiré patterns during stacking, which affects display quality.

SUMMARY

The disclosure provides a display apparatus with better display quality.

The display apparatus of the disclosure includes a first cholesteric liquid crystal panel, a second cholesteric liquid crystal panel, and a third cholesteric liquid crystal panel. The first cholesteric liquid crystal panel has a light receiving surface. The second cholesteric liquid crystal panel overlaps the first cholesteric liquid crystal panel and is disposed on a side of the first cholesteric liquid crystal panel away from the light receiving surface. The third cholesteric liquid crystal panel overlaps the second cholesteric liquid crystal panel and is disposed on a side of the second cholesteric liquid crystal panel away from the first cholesteric liquid crystal panel. One of the first cholesteric liquid crystal panel, the second cholesteric liquid crystal panel, and the third cholesteric liquid crystal panel is provided with multiple first light shielding patterns separated from each other.

Based on the above, in the display apparatus of an embodiment of the disclosure, at least one of the three cholesteric liquid crystal panels overlapping each other is provided with multiple light shielding patterns separated from each other. In this way, moiré patterns caused by stacking these cholesteric liquid crystal panels may be effectively suppressed, and the flexibility in design of the display apparatus may be enhanced to meet different requirements of optical performance (such as display brightness or display contrast).

DESCRIPTION OF THE EMBODIMENTS

The usages of "approximately," "similar to," "essentially," or "substantially" indicated throughout the specification include the indicated value and an average value having an acceptable deviation range, which is a certain value confirmed by people skilled in the art, and is a certain amount considered the discussed measurement and measurement-related deviation (i.e., the limitation of measurement system). For example, "approximately" may indicate to be within one or more standard deviations of the indicated value, such as being within ±30%, ±20%, ±15%, ±10%, or ±5%. Furthermore, the usages of "approximately," "similar to," "essentially," or "substantially" indicated throughout the specification may refer to a more acceptable deviation scope or standard deviation depending on measurement properties, cutting properties, or other properties, and all properties may not be applied with one standard deviation.

In the drawings, for clarity, the thickness of layers, films, plates, areas, and the like are magnified. It should be understood that when an element such as a layer, a film, an area, or a substrate is indicated to be "on" another element or "connected to" another element, it may be directly on another element or connected to another element, or an element in the middle may exist. In contrast, when an element is indicated to be "directly on another element" or "directly connected to" another element, an element in the middle does not exist. As used herein, "to connect" may indicate to physically and/or electrically connect. Furthermore, "electrically connected" may also be used when other elements exist between two elements.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 1:
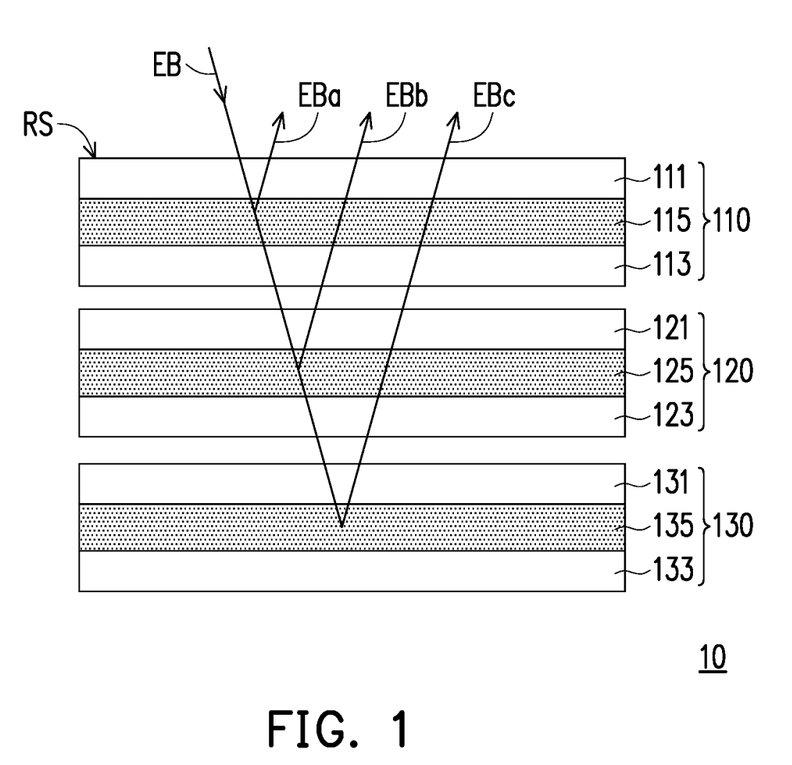
FIG. 1 is a schematic cross-sectional view of a display apparatus according to the first embodiment of the disclosure.
Figure 2A:
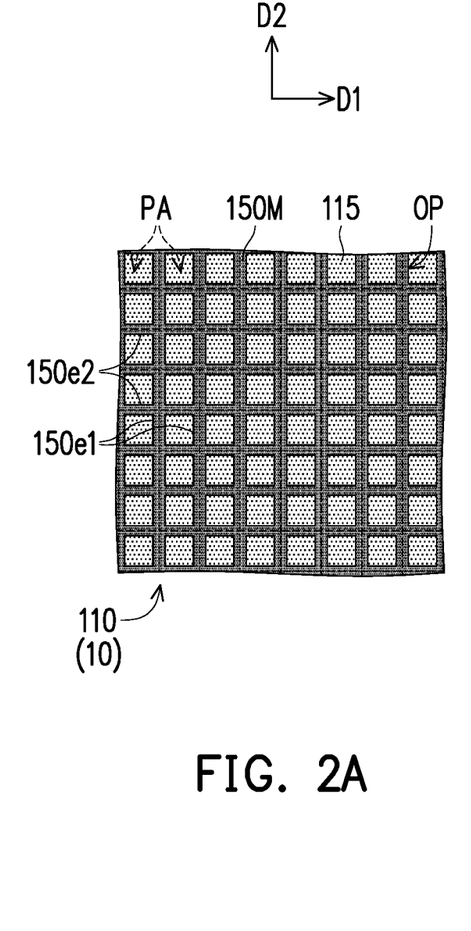
FIG. 2A to FIG. 2C are respectively schematic top views of a first cholesteric liquid crystal panel, a second cholesteric liquid crystal panel, and a third cholesteric liquid crystal panel in FIG. 1.
Figure 2B:
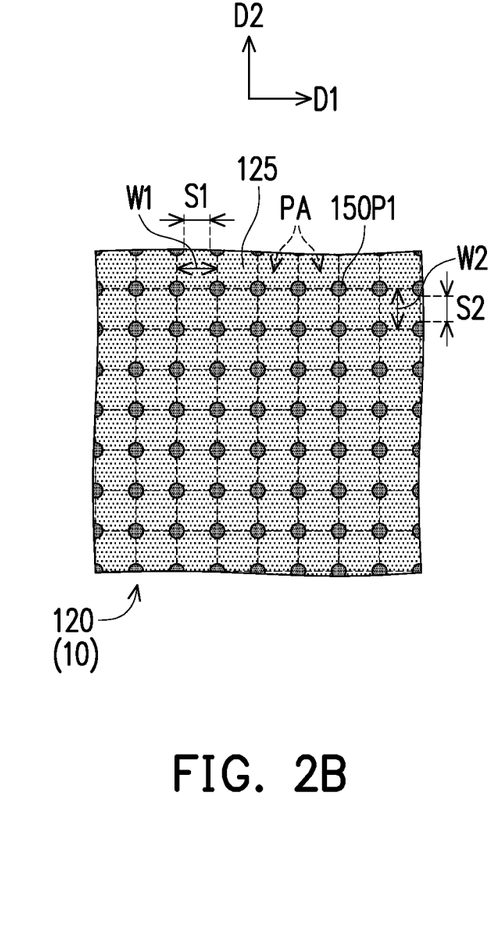
Figure 2C:
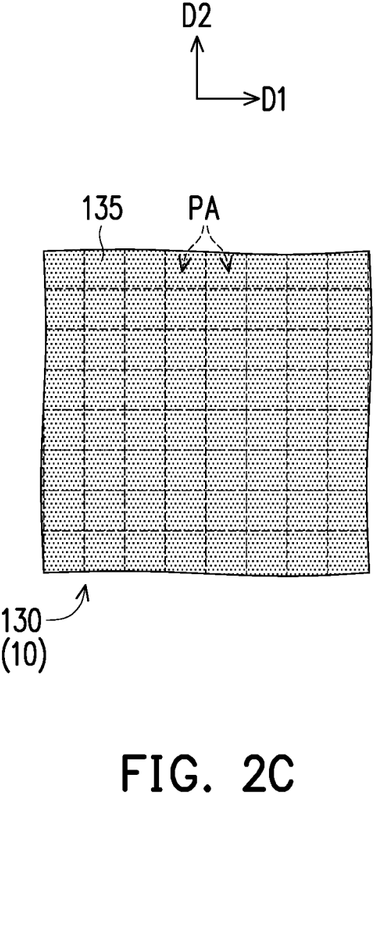
Figure 3A:
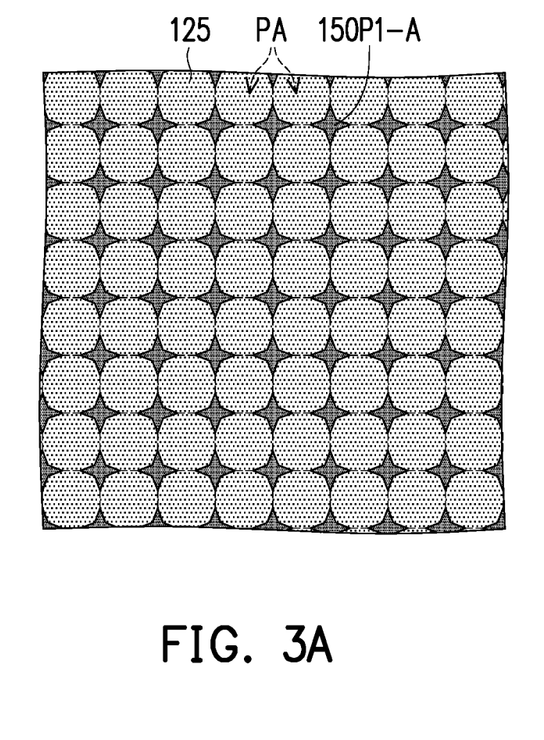
FIG. 3A and FIG. 3B are schematic top views of the second cholesteric liquid crystal panel in FIG. 2B according to some modified embodiments of the disclosure.
Figure 3B:
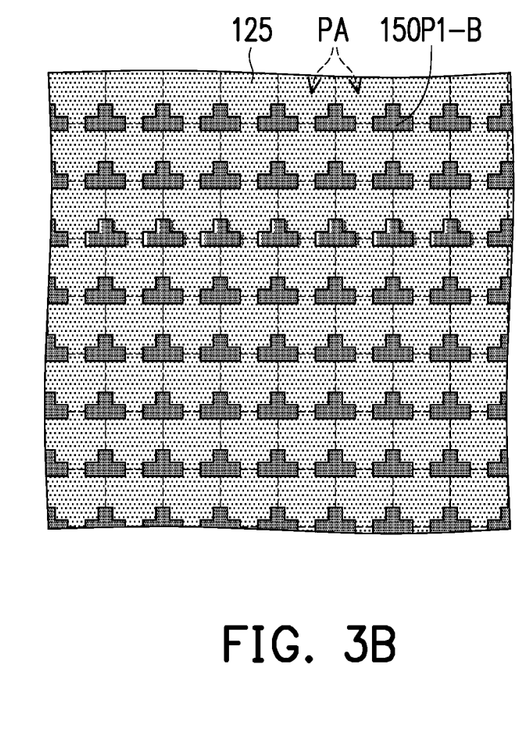

FIG. 1 is a schematic cross-sectional view of a display apparatus according to the first embodiment of the disclosure. FIG. 2A to FIG. 2C are respectively schematic top views of a first cholesteric liquid crystal panel, a second cholesteric liquid crystal panel, and a third cholesteric liquid crystal panel in FIG. 1. FIG. 3A and FIG. 3B are schematic top views of the second cholesteric liquid crystal panel in FIG. 2B according to some modified embodiments of the disclosure.

With reference to FIG. 1, a display apparatus 10 has multiple pixel areas PA and includes multiple stacked cholesteric liquid crystal panels, such as: a first cholesteric liquid crystal panel 110, a second cholesteric liquid crystal panel 120, and a third cholesteric liquid crystal panel 130. These cholesteric liquid crystal panels may be respectively used to reflect light of different colors (or wavelengths). For example, the first cholesteric liquid crystal panel 110, the second cholesteric liquid crystal panel 120, and the third cholesteric liquid crystal panel 130 are respectively adapted to reflect blue light, green light, and red light, but the disclosure is not limited thereto. More specifically, in these cholesteric liquid crystal panels, three pixel structures (not shown) overlapping in the same pixel area PA along the stacking direction may constitute one color display pixel of the display apparatus 10.

In this embodiment, the first cholesteric liquid crystal panel 110 is provided with a light receiving surface RS of the display apparatus 10, while the second cholesteric liquid crystal panel 120 and the third cholesteric liquid crystal panel 130 are sequentially disposed on the side of the first cholesteric liquid crystal panel 110 away from the light receiving surface RS. In other words, the third cholesteric liquid crystal panel 130 is located on the side of the second cholesteric liquid crystal panel 120 away from the first cholesteric liquid crystal panel 110.

Before entering the display apparatus 10 from the light receiving surface RS, an environment beam EB (e.g., white light or sunlight) first passes through the first cholesteric liquid crystal panel 110. At this time, the light component with blue wavelengths in the environment beam EB (e.g., a sub-beam EBa) is reflected by the first cholesteric liquid crystal panel 110. The light components with other wavelengths pass through the first cholesteric liquid crystal panel 110 and enter the second cholesteric liquid crystal panel 120, and the light component with green wavelengths in the environment beam EB (e.g., a sub-beam EBb) is reflected by the second cholesteric liquid crystal panel 120. The light components with non-blue and non-green wavelengths pass through the second cholesteric liquid crystal panel 120 and enter the third cholesteric liquid crystal panel 130. The light component with red wavelengths in the environment beam EB (e.g., a sub-beam EBc) is reflected by the third cholesteric liquid crystal panel 130.

It should be noted that in an embodiment not shown, the display apparatus may optionally include a light absorbing layer disposed on the side of the third cholesteric liquid crystal panel 130 away from the second cholesteric liquid crystal panel 120. The light absorbing layer is used to absorb residual light in the environment beam EB passing through these cholesteric liquid crystal panels, thereby improving the display quality of the display apparatus (e.g., display contrast or color gamut performance).

Furthermore, each of these cholesteric liquid crystal panels includes two substrates and a cholesteric liquid crystal layer disposed between the two substrates. For example, the first cholesteric liquid crystal panel 110 has a substrate 111, a substrate 113, and a cholesteric liquid crystal layer 115, the second cholesteric liquid crystal panel 120 has a substrate 121, a substrate 123, and a cholesteric liquid crystal layer 125, and the third cholesteric liquid crystal panel 130 has a substrate 131, a substrate 133, and a cholesteric liquid crystal layer 135. For the thickness uniformity of cholesteric liquid crystal layers, multiple spacers (not shown) are usually disposed between two substrates. These spacers may be distributed among the pixel areas PA of the cholesteric liquid crystal panels.

Since the cholesteric liquid crystal layers may cause light leakage due to poor arrangement of the disposed spacers, the display apparatus 10 is also disposed with multiple light shielding pattern layers for shielding the light leakage, and these light shielding pattern layers are respectively disposed on at least part of the cholesteric liquid crystal panels. It should be noted that one of these light shielding pattern layers has multiple first light shielding patterns separated from each other, and the others have multiple second light shielding patterns separated from each other or have a mesh light shielding pattern having multiple openings. These openings are respectively disposed corresponding to the aforementioned pixel areas PA. In this way, the moiré patterns caused by stacking the cholesteric liquid crystal panels may be effectively suppressed, which helps improve the display quality of the display apparatus 10.

With reference to FIG. 2A to FIG. 2C together, in this embodiment, the first cholesteric liquid crystal panel 110 may be provided with a mesh light shielding pattern 150M, and the mesh light shielding pattern 150M has multiple openings OP disposed corresponding to the pixel areas PA. The second cholesteric liquid crystal panel 120 may be provided with multiple first light shielding patterns 150P1 separated from each other, and these first light shielding patterns 150P1 are disposed between the pixel areas PA. For example, the mesh light shielding pattern 150M has multiple first extension sections 150e1 and multiple second extension sections 150e2. The first extension sections 150e1 intersect the second extension sections 150e2 and form the openings OP structurally separated from each other.

It should be noted that the first light shielding patterns 150P1 on the second cholesteric liquid crystal panel 120 overlap these extension sections of the mesh light shielding pattern 150M on the first cholesteric liquid crystal panel 110 along the stacking direction of these cholesteric liquid crystal panels. In other words, the arrangement period of these extension sections in a direction (e.g., a direction D1 or a direction D2) is substantially equal to the arrangement period of the first light shielding patterns 150P1 in this direction.

In detail, the pixel areas PA of the display apparatus 10 may be respectively arranged in multiple rows and multiple columns along the direction D1 and the direction D2, and each pixel area PA respectively has a first width W1 and a second width W2 along the direction D1 and the direction D2. For example, the first width W1 may define the arrangement period of the first extension sections 150e1 (or the first light shielding patterns 150P1) of the mesh light shielding pattern 150M along the direction D1, and the second width W2 may define the arrangement period of the second extension sections 150e2 (or the first light shielding patterns 150P1) of the mesh light shielding pattern 150M along the direction D2.

On the other hand, any two adjacent first light shielding patterns 150P1 arranged along the direction D1 have a first spacing S1, and any two adjacent first light shielding patterns 150P1 arranged along the direction D2 have a second spacing S2. Preferably, the ratio of the first spacing S1 to the first width W1 (or the ratio of the second spacing S2 to the second width W2) is greater than 0.25 and less than 0.9. The satisfaction of this numerical range may not only effectively suppress the generation of moiré patterns but also provide sufficient support for the aforementioned spacers.

From another point of view, when the ratio of the first spacing S1 to the first width W1 (or the ratio of the second spacing S2 to the second width W2) is less than or equal to 0.25, the overall configuration of the first light shielding patterns 150P1 becomes relatively similar to the mesh light shielding pattern 150M and results in more serious moiré patterns; when the ratio of the first spacing S1 to the first width W1 (or the ratio of the second spacing S2 to the second width W2) is greater than or equal to 0.9, these first light shielding patterns 150P1 cannot have sufficient support for the spacers.

Furthermore, the orthographic projection profile of the first light shielding pattern 150P1 on the light receiving surface RS of FIG. 1 may include an arc shape, a curved line shape, or a combination thereof. For example, in this embodiment, the orthographic projection profile of the first light shielding pattern 150P1 on the light receiving surface RS may be a circle, but the disclosure is not limited thereto. In another embodiment, the orthographic projection profile of a light shielding pattern 150P1-A on the light receiving surface RS1 of FIG. 1 may also be a star shape (as shown in FIG. 3A). In yet another embodiment, the orthographic projection profile of a light shielding pattern 150P1-B on the light receiving surface RS1 of FIG. 1 may also be a stepped shape (as shown in FIG. 3B).

It is worth mentioning that, in this embodiment, since the mesh light shielding pattern 150M is disposed on the first cholesteric liquid crystal panel 110, the display apparatus 10 may have better display contrast. The second cholesteric liquid crystal panel 120 near the first cholesteric liquid crystal panel 110 is provided with the first light shielding patterns 150P1 structurally separated from each other, which may significantly reduce the moiré patterns formed by stacking the two light shielding pattern layers of the two cholesteric liquid crystal panels. It should be noted that, in this embodiment, the third cholesteric liquid crystal panel 130 may not have a light shielding pattern layer, but the disclosure is not limited thereto.

From another point of view, with the interaction of the structures and positions of the disposed two light shielding pattern layers, the flexibility in design of the display apparatus 10 may be enhanced to meet different requirements of optical performance (such as display brightness or display contrast).

Other embodiments are described below to explain the disclosure in detail, and the same components will be denoted by the same reference numerals, and the description of the same technical content will be omitted. For the description of the omitted part, reference may be made to the above embodiment, and details are not described in the following embodiments.

Figure 4A:
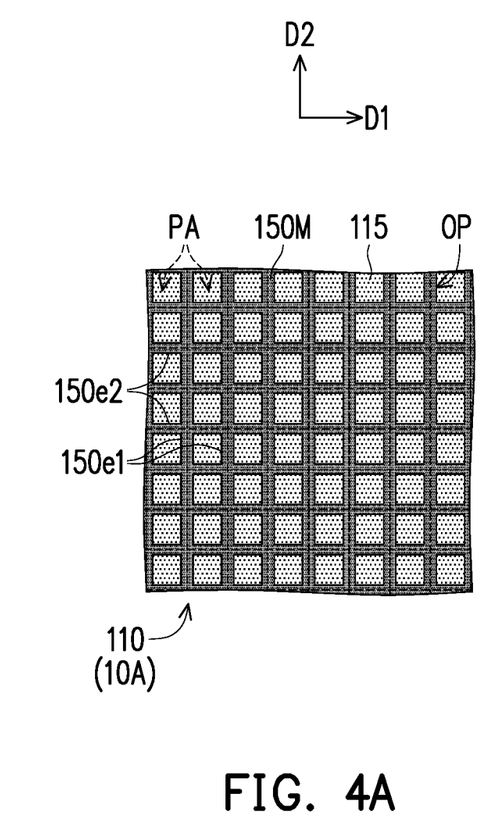
FIG. 4A to FIG. 4C are respectively schematic top views of a first cholesteric liquid crystal panel, a second cholesteric liquid crystal panel, and a third cholesteric liquid crystal panel of the display apparatus according to the second embodiment of the disclosure.
Figure 4B:
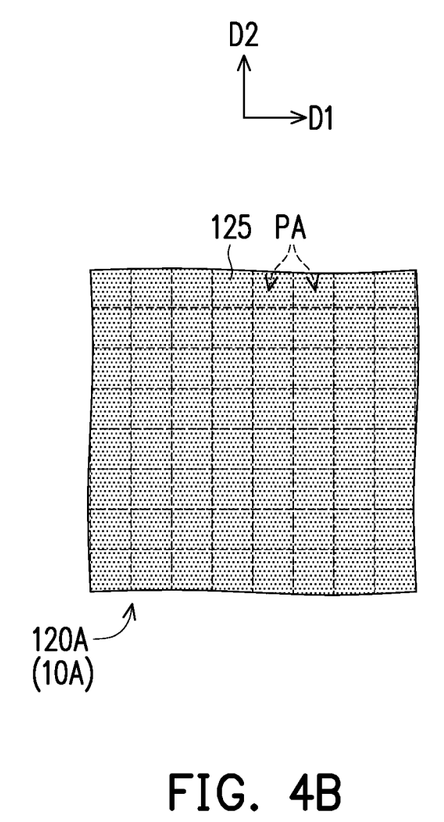
Figure 4C:
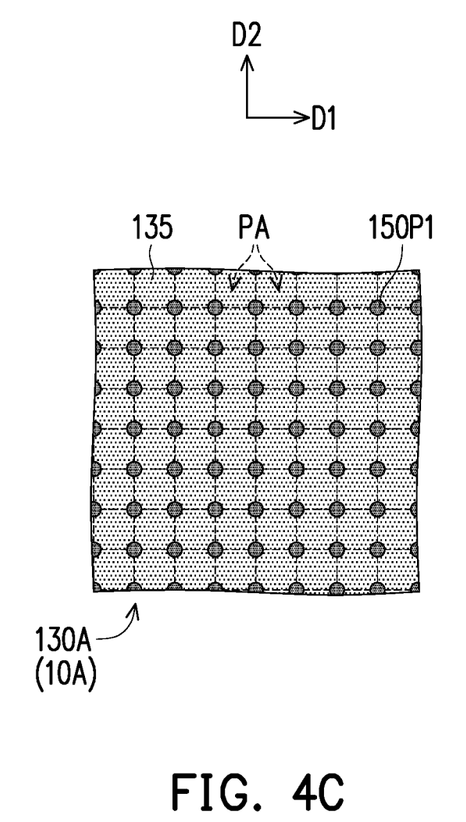

FIG. 4A to FIG. 4C are respectively schematic top views of a first cholesteric liquid crystal panel, a second cholesteric liquid crystal panel, and a third cholesteric liquid crystal panel of the display apparatus according to the second embodiment of the disclosure. With reference to FIG. 4A to FIG. 4C, a display apparatus 10A of this embodiment and the display apparatus 10 of FIG. 2A to FIG. 2C are different in the positions of the disposed first light shielding patterns 150P1. For example, in this embodiment, a third cholesteric liquid crystal panel 130A of the display apparatus 10A is provided with these first light shielding patterns 150P1, while a second cholesteric liquid crystal panel 120A does not disposed with any light shielding pattern layers.

Since the structures and configurations of the two light shielding pattern layers of this embodiment (i.e., the mesh light shielding pattern 150M and the first light shielding patterns 150P1) have technical effects similar to those of the display apparatus 10 in the foregoing embodiment, please refer to the relevant paragraphs of the foregoing embodiment for detailed description and details are not repeated here.

Figure 5A:
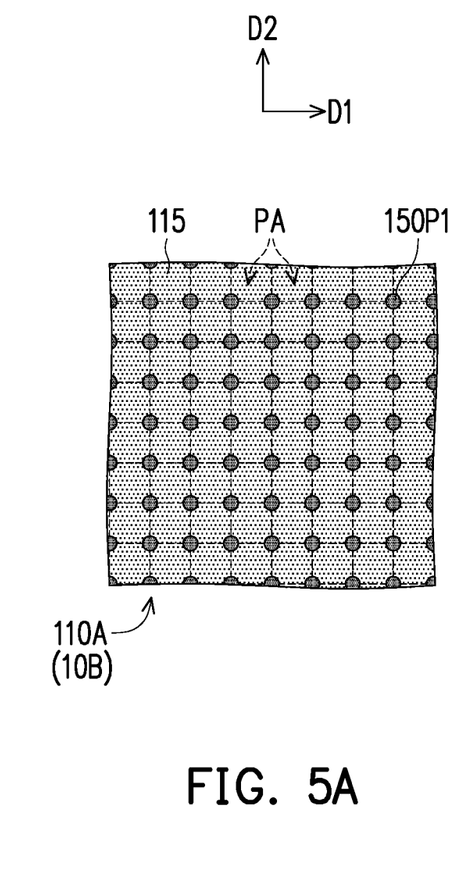
FIG. 5A to FIG. 5C are respectively schematic top views of a first cholesteric liquid crystal panel, a second cholesteric liquid crystal panel, and a third cholesteric liquid crystal panel of the display apparatus according to the third embodiment of the disclosure.
Figure 5B:
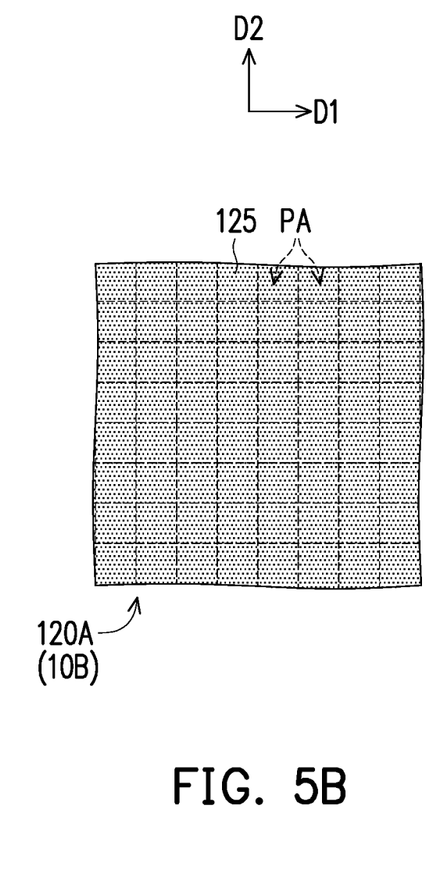
Figure 5C:
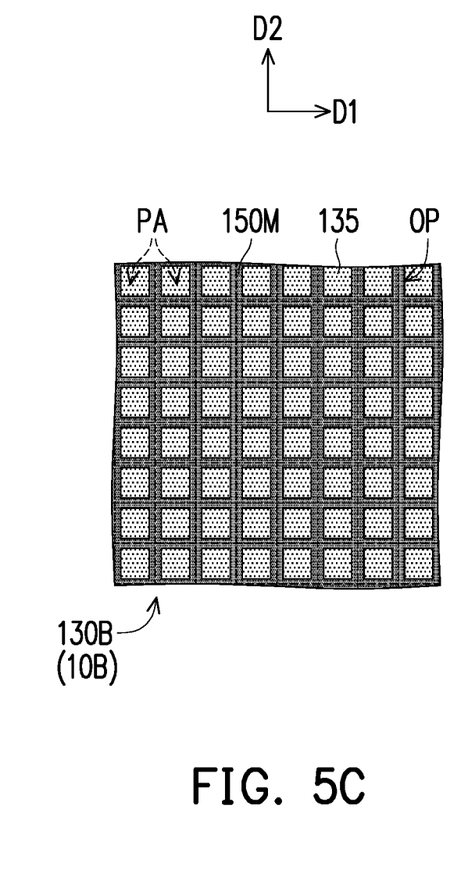

FIG. 5A to FIG. 5C are respectively schematic top views of a first cholesteric liquid crystal panel, a second cholesteric liquid crystal panel, and a third cholesteric liquid crystal panel of the display apparatus according to the third embodiment of the disclosure. With reference to FIG. 5A to FIG. 5C, a display apparatus 10B of this embodiment and the display apparatus 10A of FIG. 4A to FIG. 4C are different in the arrangement order of two light shielding pattern layers. Specifically, in this embodiment, a first cholesteric liquid crystal panel 110A of the display apparatus 10B is provided with the first light shielding pattern 150P1, and a third cholesteric liquid crystal panel 130B is provided with the mesh light shielding pattern 150M.

Since the mesh light shielding pattern 150M of this embodiment is disposed at the position farthest from the light receiving surface RS (as shown in FIG. 1) of the display apparatus 10B, this may not only further improve the suppression of moiré patterns but also increase the overall reflectivity of the display apparatus 10B.

Figure 6A:
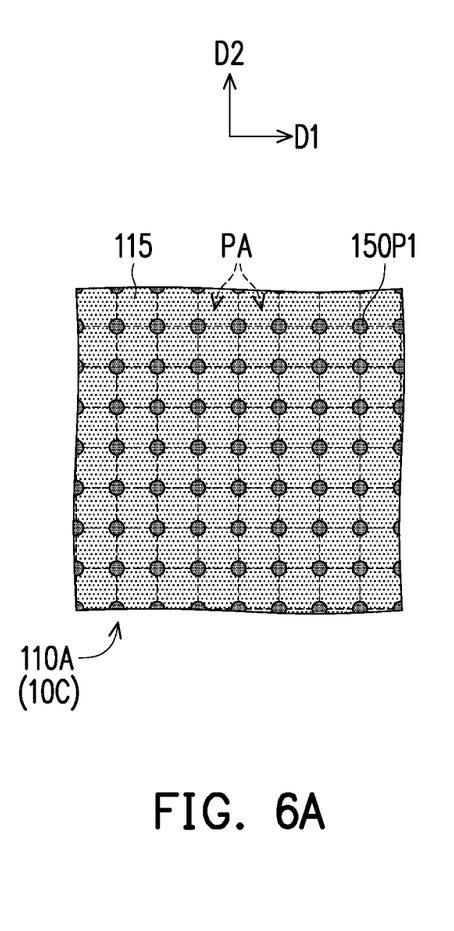
FIG. 6A to FIG. 6C are respectively schematic top views of a first cholesteric liquid crystal panel, a second cholesteric liquid crystal panel, and a third cholesteric liquid crystal panel of the display apparatus according to the fourth embodiment of the disclosure.
Figure 6B:
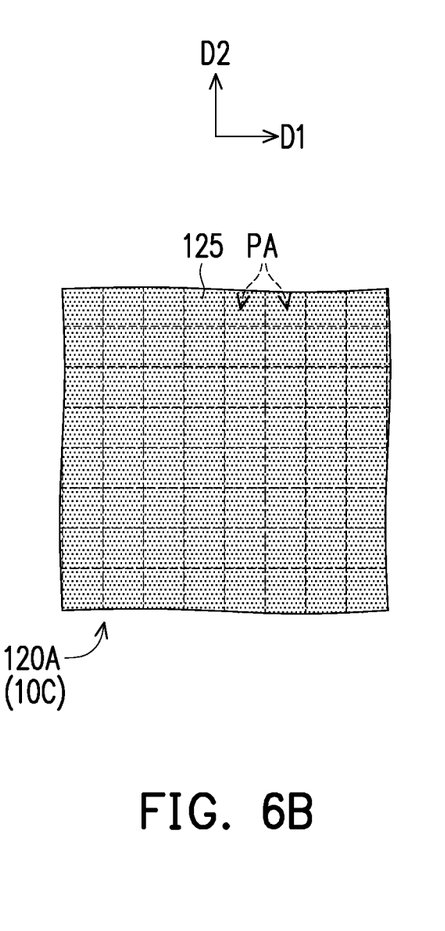
Figure 6C:
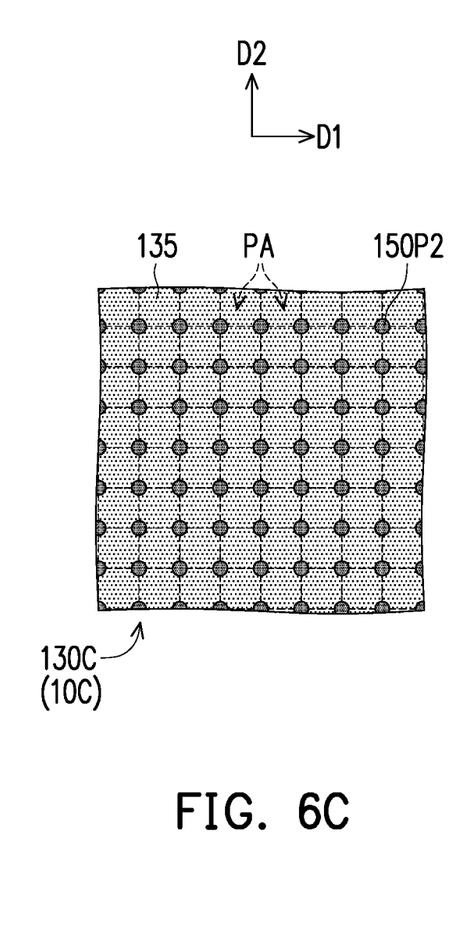

FIG. 6A to FIG. 6C are respectively schematic top views of a first cholesteric liquid crystal panel, a second cholesteric liquid crystal panel, and a third cholesteric liquid crystal panel of the display apparatus according to the fourth embodiment of the disclosure. With reference to FIG. 6A to FIG. 6C, a display apparatus 10C of the present embodiment and the display apparatus 10B of FIG. 5A to FIG. 5C are different that the display apparatus 10C of this embodiment replaces the mesh light shielding pattern 150M of FIG. 5C with multiple second light shielding patterns 150P2 separated from each other.

In other words, in this embodiment, the first cholesteric liquid crystal panel 110A is provided with the first light shielding patterns 150P1, the third cholesteric liquid crystal panel 130C is provided with the second light shielding patterns 150P2, while the second cholesteric liquid crystal panel 120A is not provided with any light shielding pattern layer. Since the disposition method and configuration of the second light shielding patterns 150P2 are similar to those of the first light shielding patterns 150P1, please refer to the relevant paragraphs of the foregoing embodiment for detailed description and details are not repeated here.

It is worth mentioning that further dividing the mesh light shielding pattern 150M of FIG. 5C into multiple light shielding patterns separated from each other (e.g., the second light shielding patterns 150P2 of this embodiment) may not only further improve the suppression of moiré patterns but also increase the overall reflectivity of the display apparatus 10C, but the disclosure is not limited thereto. In another embodiment not shown, the display apparatus may have only the first cholesteric liquid crystal panel provided with multiple light shielding patterns separated from each other to further improve the overall reflectivity of the display apparatus.

Figure 7A:
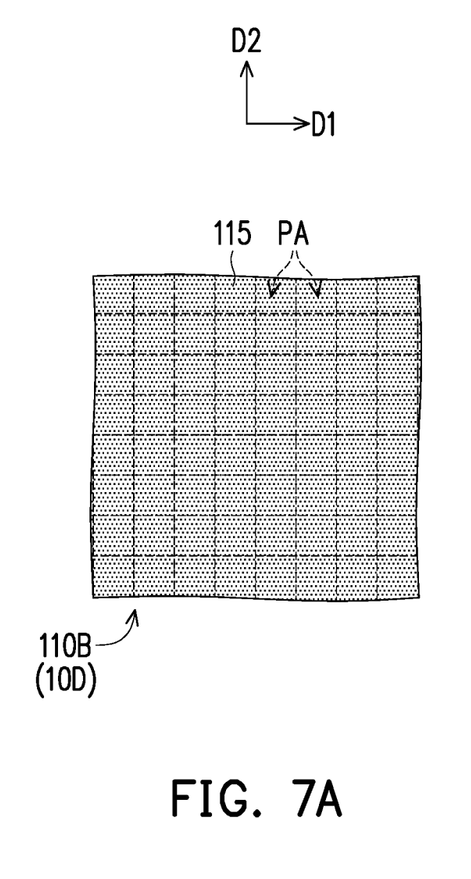
FIG. 7A to FIG. 7C are respectively schematic top views of a first cholesteric liquid crystal panel, a second cholesteric liquid crystal panel, and a third cholesteric liquid crystal panel of the display apparatus according to the fifth embodiment of the disclosure.
Figure 7B:
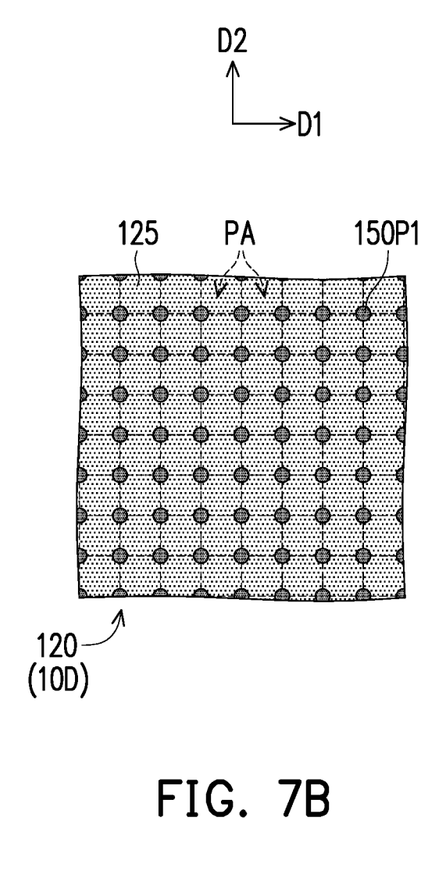
Figure 7C:
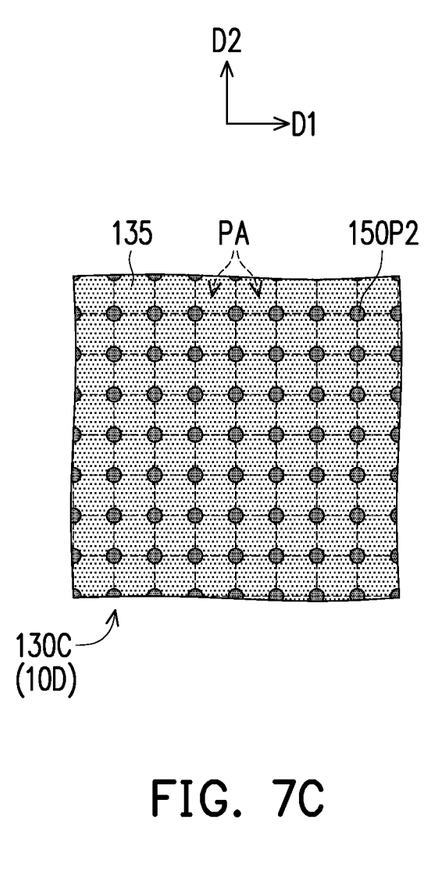

FIG. 7A to FIG. 7C are respectively schematic top views of a first cholesteric liquid crystal panel, a second cholesteric liquid crystal panel, and a third cholesteric liquid crystal panel of the display apparatus according to the fifth embodiment of the disclosure. With reference to FIG. 7A to FIG. 7C, a display apparatus 10D of this embodiment and the display apparatus 10C of FIG. 6A to FIG. 6C are different in the positions of the disposed first light shielding patterns 150P1. For example, in this embodiment, these first light shielding patterns 150P1 may be changed to be disposed on the second cholesteric liquid crystal panel 120, while the first cholesteric liquid crystal panel 110B is not disposed with any light shielding pattern layers, but the disclosure is not limited thereto. In another embodiment not shown, the display apparatus may have only the second cholesteric liquid crystal panel provided with multiple light shielding patterns separated from each other to further improve the overall reflectivity of the display apparatus.

Since the structures and configurations of the two light shielding pattern layers of this embodiment (i.e., the first light shielding patterns 150P1 and the second light shielding patterns 150P2) have technical effects similar to those of the display apparatus 10C in the foregoing embodiment, please refer to the relevant paragraphs of the foregoing embodiment for detailed description and details are not repeated here.

Figure 8A:
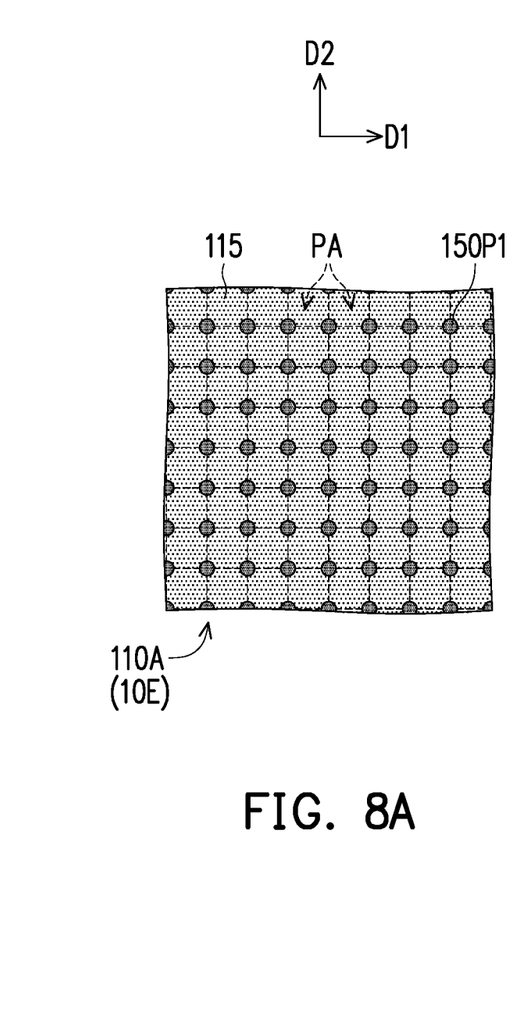
FIG. 8A to FIG. 8C are respectively schematic top views of a first cholesteric liquid crystal panel, a second cholesteric liquid crystal panel, and a third cholesteric liquid crystal panel of the display apparatus according to the sixth embodiment of the disclosure.
Figure 8B:
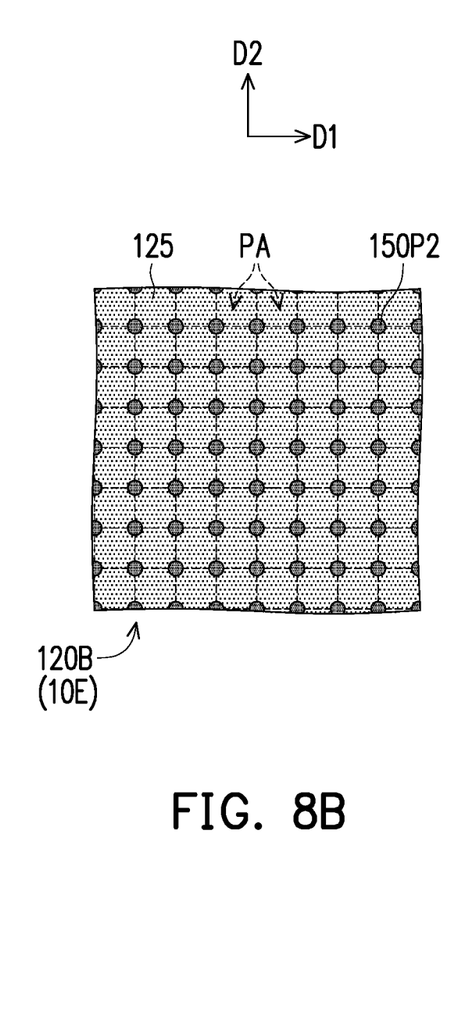
Figure 8C:
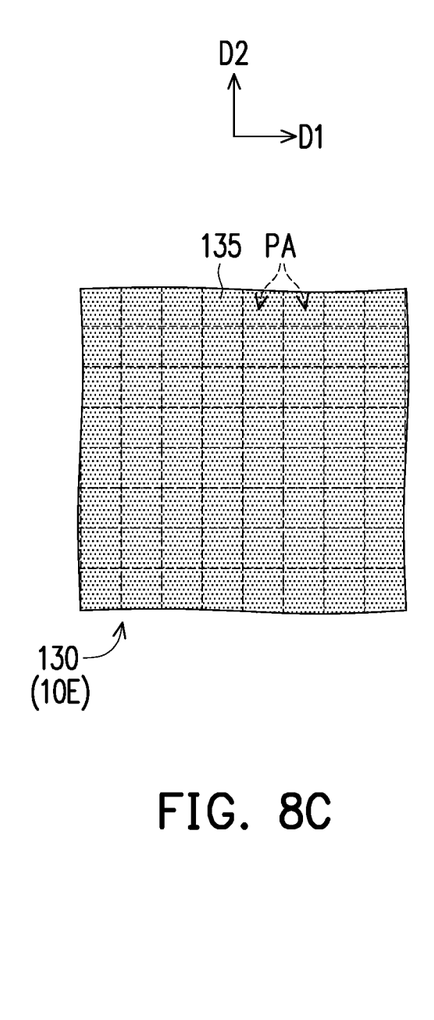

FIG. 8A to FIG. 8C are respectively schematic top views of a first cholesteric liquid crystal panel, a second cholesteric liquid crystal panel, and a third cholesteric liquid crystal panel of the display apparatus according to the sixth embodiment of the disclosure. With reference to FIG. 8A to FIG. 8C, a display apparatus 10E of this embodiment and the display apparatus 10C of FIG. 6A to FIG. 6C are different in the positions of the disposed second light shielding patterns 150P2. For example, in this embodiment, these second light shielding patterns 150P2 may be changed to be disposed on the second cholesteric liquid crystal panel 120B, while the third cholesteric liquid crystal panel 130 is not disposed with any light shielding pattern layers.

Since the structures and configurations of the two light shielding pattern layers of this embodiment (i.e., the first light shielding patterns 150P1 and the second light shielding patterns 150P2) have technical effects similar to those of the display apparatus 10C in the foregoing embodiment, please refer to the relevant paragraphs of the foregoing embodiment for detailed description and details are not repeated here.

Figure 9A:
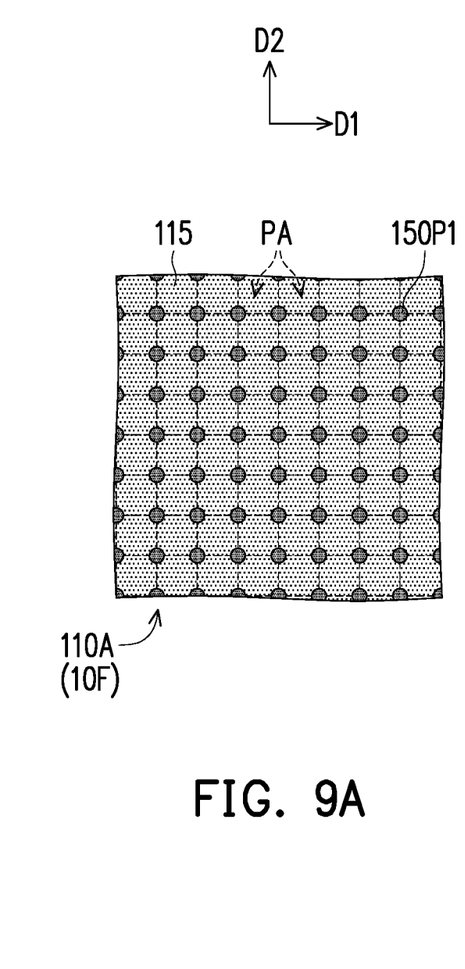
FIG. 9A to FIG. 9C are respectively schematic top views of a first cholesteric liquid crystal panel, a second cholesteric liquid crystal panel, and a third cholesteric liquid crystal panel of the display apparatus according to the seventh embodiment of the disclosure.
Figure 9B:
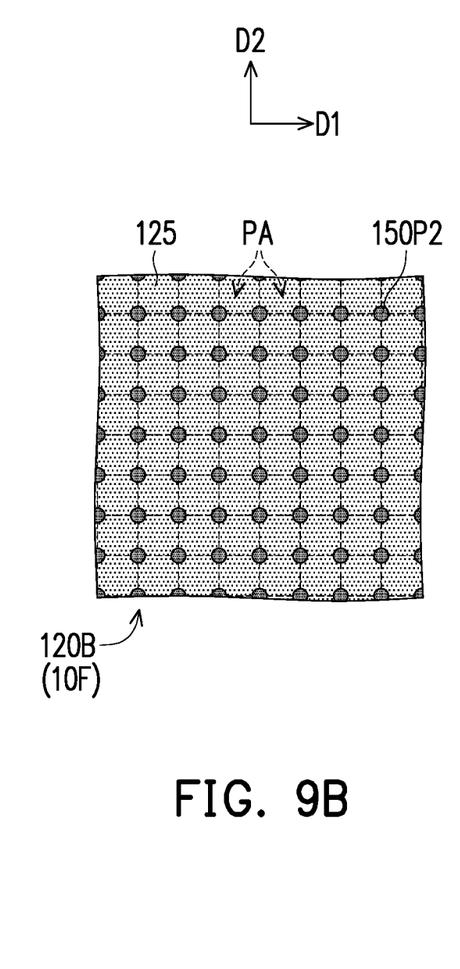
Figure 9C:
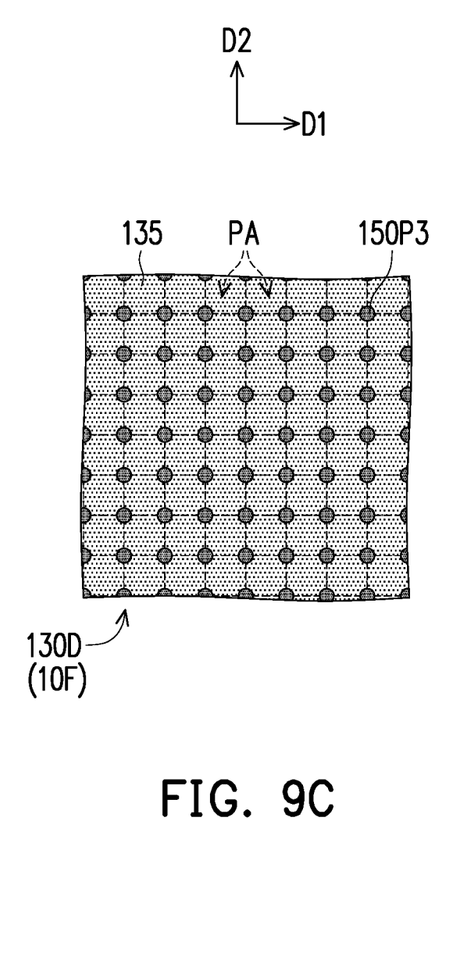

FIG. 9A to FIG. 9C are respectively schematic top views of a first cholesteric liquid crystal panel, a second cholesteric liquid crystal panel, and a third cholesteric liquid crystal panel of the display apparatus according to the seventh embodiment of the disclosure. With reference to FIG. 9A to FIG. 9C, a display apparatus 10F of this embodiment and the display apparatus 10E of FIG. 8A to FIG. 8C are different that a third cholesteric liquid crystal panel 130D of this embodiment is provided with multiple third light shielding patterns 150P3 structurally separated from each other. Since the disposition method and configuration of the third light shielding patterns 150P3 are similar to those of the first light shielding patterns 150P1, please refer to the relevant paragraphs of the foregoing embodiment for detailed description and details are not repeated here.

Since the configurations of the three light shielding pattern layers of this embodiment (i.e., the first light shielding patterns 150P1, the second light shielding patterns 150P2, and the third light shielding patterns 150P3) have technical effects similar to those of the display apparatus 10 in FIG. 1, please refer to the relevant paragraphs of the foregoing embodiment for detailed description and details are not repeated here.

In summary, in the display apparatus of an embodiment of the disclosure, at least one of the three cholesteric liquid crystal panels overlapping each other is provided with multiple light shielding patterns separated from each other. In this way, moiré patterns caused by stacking these cholesteric liquid crystal panels may be effectively suppressed, and the flexibility in design of the display apparatus may be enhanced to meet different requirements of optical performance (such as display brightness or display contrast).

What is claimed is:

1. A display apparatus, having a plurality of pixel areas, and comprising:
    a first cholesteric liquid crystal panel, having a light receiving surface;
    a second cholesteric liquid crystal panel, overlapping the first cholesteric liquid crystal panel, and disposed on a side of the first cholesteric liquid crystal panel away from the light receiving surface; and
    a third cholesteric liquid crystal panel, overlapping the second cholesteric liquid crystal panel, and disposed on a side of the second cholesteric liquid crystal panel away from the first cholesteric liquid crystal panel,
    wherein one of the first cholesteric liquid crystal panel, the second cholesteric liquid crystal panel, and the third cholesteric liquid crystal panel is provided with a plurality of first light shielding patterns separated from each other, the first light shielding patterns are separately arranged along a first direction and a second direction, and the first direction is perpendicular to the second direction.

2. The display apparatus according to claim 1, wherein another one of the first cholesteric liquid crystal panel, the second cholesteric liquid crystal panel, and the third cholesteric liquid crystal panel is provided with a plurality of second light shielding patterns separated from each other or a mesh light shielding pattern having a plurality of openings, and the openings are respectively disposed corresponding to the pixel areas.

3. The display apparatus according to claim 2, wherein the third cholesteric liquid crystal panel is provided with the first light shielding patterns, and the first cholesteric liquid crystal panel or the second cholesteric liquid crystal panel is provided with the second light shielding patterns.

4. The display apparatus according to claim 3, wherein the first cholesteric liquid crystal panel is provided with the second light shielding patterns.

5. The display apparatus according to claim 2, wherein the third cholesteric liquid crystal panel is provided with the mesh light shielding pattern, and the first cholesteric liquid crystal panel is provided with the first light shielding patterns.

6. The display apparatus according to claim 2, wherein the first cholesteric liquid crystal panel is provided with the mesh light shielding pattern, and the second cholesteric liquid crystal panel or the third cholesteric liquid crystal panel is provided with the first light shielding patterns.

7. The display apparatus according to claim 2, wherein the first cholesteric liquid crystal panel is provided with the first light shielding patterns, and the second cholesteric liquid crystal panel is provided with the second light shielding patterns.

8. The display apparatus according to claim 2, wherein the pixel areas are arranged along a first direction, each of the pixel areas has a first width along the first direction, any two adjacent ones of the first light shielding patterns or the second light shielding patterns arranged along the first direction have a first spacing, and a ratio of the first spacing to the first width is greater than 0.25 and less than 0.9.

9. The display apparatus according to claim 8, wherein the pixel areas are also arranged along a second direction, the second direction intersects with the first direction, each of the pixel areas has a second width along the second direction, any two adjacent ones of the first light shielding patterns or the second light shielding patterns arranged along the second direction have a second spacing, and a ratio of the second spacing to the second width is greater than 0.25 and less than 0.9.

10. The display apparatus according to claim 2, wherein an orthographic projection profile of each of the first light shielding patterns or each of the second light shielding patterns on the light receiving surface comprises an arc shape or a curved line shape.

11. The display apparatus according to claim 1, wherein the first cholesteric liquid crystal panel, the second cholesteric liquid crystal panel, and the third cholesteric liquid crystal panel are respectively adapted to reflect light of different colors.

* * * * *